(No Model.)
L. C. STARK.
LAWN MOWER.
No. 523,692. Patented July 31, 1894.
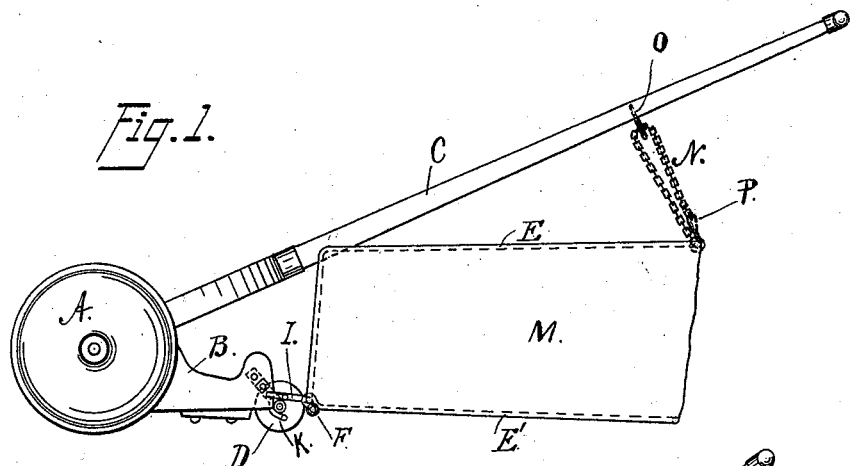
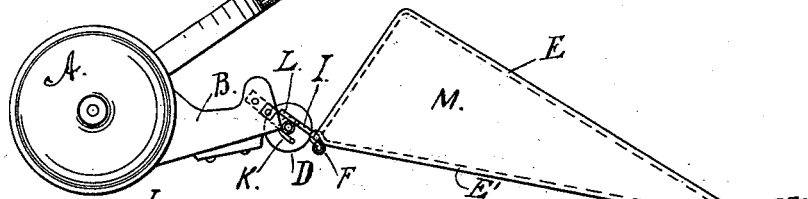
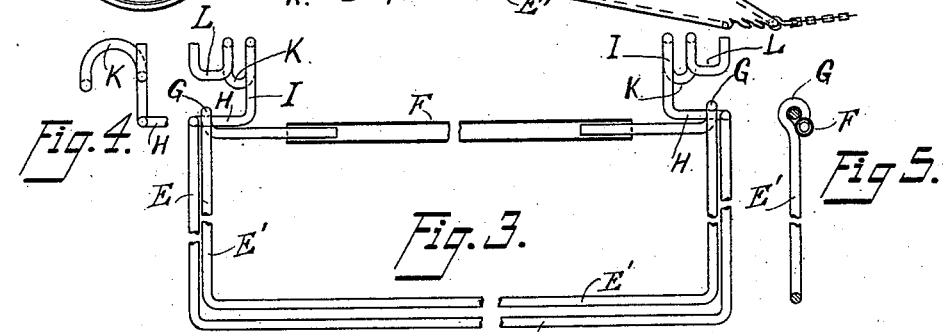
Witnesses.
Chas. H. Tucker
Anna V. Faust
Inventor.
Louis C. Stark
By Benedict Morsell
Attorneys.

UNITED STATES PATENT OFFICE.

LOUIS C. STARK, OF APPLETON, WISCONSIN.

LAWN-MOWER.

SPECIFICATION forming part of Letters Patent No. 523,692, dated July 31, 1894.

Application filed April 19, 1894. Serial No. 508,089. (No model.)

*To all whom it may concern:*

Be it known that I, LOUIS C. STARK, of Appleton, in the county of Outagamie and State of Wisconsin, have invented a new and useful Improvement in Lawn-Mowers, of which the following is a description, reference being had to the accompanying drawings, which are a part of this specification.

My invention consists in a general way, in providing a grass catcher for a lawn mower, the grass catcher being so constructed as to be attachable to lawn mowers of different widths and heights, to be easily and readily detachable therefrom, and when attached to a mower to be close to the rear roller of the mower over which roller the cut grass is thrown into the catcher.

In the drawings, Figure 1, is an elevation of a lawn mower with my improved catcher attached thereto. Fig. 2, is an elevation of the same lawn mower, with my improved catcher attached thereto in the partially collapsed position, thus illustrating the convenient method of detaching the grass catcher from the mower. Fig. 3, is an outline of the frame of the grass catcher, parts being broken away for convenience of illustration. Figs. 4 and 5 are fragments of the catcher frame, illustrating details of structure. Fig. 6 is a detail.

In the drawings, A represents the wheels, B the frame and C the tongue or handle of a lawn mower, substantially of a form in common use.

D is the rear roller of the lawn mower journaled in the frame between the rearwardly extending sides thereof. The roller is of such length as to leave short spaces between its ends and the adjacent sides of the frame in which the journals or gudgeons of the roller have their bearings.

A more full or detailed illustration of the lawn mower is not deemed necessary, as lawn mowers of this character are in common use, and are well known. The knives of such a lawn mower are so constructed and arranged as to cut the grass, which is thrown or falls rearwardly on the frame, or a platform thereof, and is pushed or carried rearwardly farther over the roller D and discharged on the ground, or into a grass catcher when such a device is attached to the mower. Lawn mowers in common use vary in width, being usually from fourteen to eighteen inches wide. One of the advantages of my improved grass catcher is that it is readily attached to lawn mowers of such varying widths, at will.

The frame of my improved grass catcher is constructed of heavy wire or rod, preferably of steel, somewhat elastic, of such size or weight as to be suitably adapted for the purpose. The frame chiefly is in two parts E and E'. The part E forms the top, rear and side and also the front vertical side portions of the frame. The part E' forms the bottom portion of the frame. The wire or rod of which the part E' is formed, extends along the rear and side bottom edge of the catcher, and at the front its extremities are turned inwardly toward each other, terminating at a distance apart but entering movably a tube F, extending in line thereof, and completing the bottom portion of the frame of the catcher. This construction permits the front extremities of the part E' to be drawn together, so as to adapt the frame to be attached to a mower of less width, than the normal size of the catcher. For the same purpose the front extremities of the part E, being elastic and not deterrently attached, may be sprung toward each other. The part E' is hinged to the part E, the part E' being therefore bent at G around inwardly projecting arms H of the part E. The parts H at both sides of the catcher, continuing project forward in arms I and are formed into recurved hooks K, and therefrom continue and terminate in hooks or bearing parts L. The hooks K are adapted to be passed over and thereby attached to the journals or bearings of the roller D, and the hooks or bearings L are adapted to receive or bear against the front extremities of the frame B, preventing lateral movement of the catcher frame.

A flexible material M, preferably of canvas is secured to the parts E E' and forms the bottom, and side and rear walls of the catcher. At the front edge this material is secured to the tube F.

A chain N, attached at one extremity to the rear upper part of the frame, runs through an eye O fixed in the handle and is secured at or near its other extremity to the snap hook P on the catcher frame. The hook takes into any link of the chain thus providing for adjusting the height of the rear of the catcher.

From the foregoing description, and by reference to the drawings it will be understood that this catcher, being made as wide as the widest mowers with which it is to be used, can readily be so sprung together or contracted at the front as to be adapted to be attached to mowers of considerably less width. Also that by reason of the hooks K, this catcher is readily attachable to the mower by slipping the hooks over the journals or journal bearings of the rear roller of the mower, and that when so attached that the catcher is held close to the roller, so as surely to receive the grass discharged over the roller from the lawn mower. It will also be noticed, that the chain N being released from the handle the rear of the catcher or box falls, so that the catcher can readily be detached from the mower. The catcher is conveniently emptied by tilting or turning it and the mower over to the front.

Having thus described my invention, what I claim, and desire to secure by Letters Patent, is—

1. In a grass catcher for lawn mowers, the combination of an elastic lower frame E' extending around the rear and sides of the catcher, and provided with loops or eyes G at the front corners, a tube forming a part of this lower frame at the front and into which the inwardly turned ends of the frame E' telescope, and an elastic upper frame E extending along the rear, the sides and the front vertical edges of the catcher, and provided with inwardly projecting arms H passing loosely through eyes G, and with the downwardly turned recurved hooks K adapted to engage and automatically to retain hold of the journals or bearings of the roller of the mower, substantially as described.

2. In a grass catcher for a lawn mower, the combination of upper and lower frames or parts hinged together, hooks on the frame adapted to take on to the journals or bearings of the roller of the mower, and hooks or bearings on the catcher frame adapted to bear against the frame of the mower, substantially as described.

In testimony whereof I affix my signature in presence of two witnesses.

LOUIS C. STARK.

Witnesses:
C. T. BENEDICT,
ANNA V. FAUST.